United States Patent Office 3,532,650
Patented Oct. 6, 1970

3,532,650
PAINT VEHICLE PREPARED FROM HOMOPOLY-
MERS OF 9-OXATETRACYCLO 4.4.1$^{2,5}$O$^{1,6}$O$^{8,10}$UN-
DECAN 4 OL
James A. Arvin, Homewood, Ill., assignor to The Sher-
win-Williams Co., Cleveland, Ohio, a corporation of
Ohio
No Drawing. Continuation-in-part of application Ser. No.
525,125, Feb. 4, 1966. This application Mar. 28, 1966,
Ser. No. 537,669
Int. Cl. C08g *17/10, 17/16;* C09d *3/64*
U.S. Cl. 260—22                           9 Claims

ABSTRACT OF THE DISCLOSURE

A process for producing a paint vehicle and the vehicle produced by said process wherein a polyol resin is esterified with an excess of an unsaturated fatty acid and wherein the esterified polyol is reacted with a given amount of either maleic anhydride or fumaric acid. If maleic anhydride is used the anhydride rings subsequently can be opened. The vehicle can also be reacted with an alkaline material to increase its water dispersibility. The vehicle serves as a basis for producing improved water-dispersible gloss or semigloss enamels. The enamels have a high water resistance, good covering power, and can be removed from brushes and rollers by water washing.

---

This application is a continuation-in-part of my copending application Ser. No. 525,125, filed Feb. 4, 1966, now abandoned.

The present invention in general relates to an improved paint vehicle. More particularly, the subject invention is directed to a novel gloss or semigloss enamel.

In recent years latex paints have enjoyed great success as flat paints. Such products are quick drying and brushes and rollers that are used to apply the paint can be water cleaned. The public acceptance of these products has spurred efforts to produce semigloss or gloss enamel products having the advantages of latex paints. Up to now, however, these efforts have not been entirely successful.

It is an object of the present invention to provide semigloss or gloss enamels which are relatively quick drying but which can still be removed from brushes and rollers before they have dried by water washing.

Another object of the invention is to provide a gloss or semigloss paint in the form of a water based colloidal dispersion.

Another object of the invention is to provide gloss or semigloss enamels which have a high water resistance, which have good covering power, and which can be applied with ease by both professional and nonprofessional painters.

Another object of the invention is to provide an improved paint vehicle for gloss and semigloss enamels.

Other objects will become apparent to those skilled in the art from the following detailed description of the invention.

In general, the present invention involves the discovery that particular modified resinous polyols serve as the basis for highly effective paint vehicles for gloss or semigloss paints. The polyols which are to be modified in producing the paint vehicles are homopolymers of 9-oxatetracyclo 4.4.1$^{2,5}$O$^{1,6}$O$^{8,10}$undecan 4 ol and have the following structural formula:

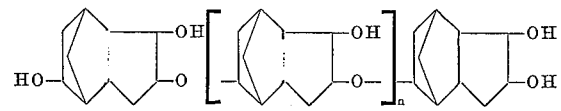

wherein *n* is a whole number between 10 and 14, and especially 12. The hydroxyl content of the polymer varies between about 11.6% and 12.1%. In preparing the paint vehicle the polyol resin initially is esterified with an unsaturated fatty acid. It is desirable to esterify the available hydroxyl groups of the polyol. For this reason an excess of fatty acid is employed. The amount of fatty acid can range from about 5 to 50% excess, and most often will be at least 10% in excess. Esterification reaction is carried out at a temperature of from about 400° to 550° F., and most often at a temperature of 450°–480° F. In general, a solvent reflux system is employed using xylene, toluene, or the like as an azeotrope to carry off water.

The esterified polyol is subsequently reacted with maleic anhydride or fumaric acid to form a maleic or fumaric adduct. Details with respect to this reaction are set forth below. A small amount of iodine can be used as a catalyst. From about 4–15%, and preferably 8 to 12%, maleic anhydride or fumaric acid based on the weight of the ester is used in the reaction. Ordinarily, a glycol ether such as butoxyethanol or a base solution is added to the system after the adduct is formed in order to open the maleic rings.

A water soluble or water dispersible product is produced by reacting the vehicle with an alkaline material. Lithium hydroxide monohydrate is commonly used as the solubilizing agent but other alkaline materials can be used for this purpose, e.g., ammonia, potassium hydroxide, sodium hydroxide, barium hydroxide, and amines which boil low enough to permit the formation of dry coatings (for example, dimethylethanolamine, trimethylamine, triethylamine, morpholine, methyl and ethyl morpholines). The alkaline material neutralizes the acid groups of the vehicle forming a salt which produces water solubility or dispersibility.

The alkaline material ordinarily is not added directly to the vehicle. The solution is usually formed by adding a cosolvent to the vehicle. A solution of the solubilizing agent in water is separately made. The diluted vehicle and the base solution are then mixed by gradual addition of the base solution to the vehicle or vice versa. In either case simultaneous (with addition) agitation is necessary.

Inasmuch as the vehicle is amphoteric in solubility, it is necessary to provide a cosolvent during the solubilization step. Examples of suitable cosolvents include generally methyl, ethyl, and butyl ethers of ethylene glycol, the methyl, ethyl, and butyl ethers of diethylene glycol, and low molecular weight alcohols and esters such as alcohols having the formula ROH where R is an alkyl chain containing from 1 to 5 carbon atoms. Specific materials would include butoxyethanol, N-propoxy propanol, N-butoxy propanol, isobutoxy propanol, ethoxy propanol, butoxy ethoxy propanol, butanol, isobutanol, amyl alcohol, isopropyl alcohol, propyl alcohol, isopropyl acetate, butyl acetate, and isobutyl acetate. Glycol ether esters such as ethoxyethylacetate and glycol diethers also could find use as cosolvents. Subsequently, water is added to produce a product having about 30% to 40% by weight solids, preferably 33% to 35% by weight solids.

The following examples are illustrative of the present invention.

EXAMPLE 1

This example shows the preparation of a paint vehicle of the subject invention. The first step involves forming a fatty acid ester of the polyol described above. 454 grams of polyol (equivalent weight 144.6) was charged into a glass flask along with 991 grams of soya fatty acids and 43 grams of xylene. The glass flask was equipped with a thermometer, agitator, heating mantle, inert gas supply, water trap and condenser. The reaction mixture was heated with a nitrogen blanket in place to a temperature of 450° F. and was held at that temperature for an acid value approaching theoretical based on hydroxyl content (16.2). The ester had the following characteristics:

Viscosity—28.3 sec. (19.3 poises)
Color—9 (hazy) poises
Acid value—15.98
NVM—96.50
Wt./gal.—8.24
Percent yield—93.28%

The ester prepared as shown above was subsequently maleinized. In preparing the adducts the ester and maleic anhydride were charged into a flask equipped with a heating mantle, agitator, thermometer, inert gas supply, and reflux condenser. Heating was begun with an inert gas blanket. A xylene dispersion of iodine was added at 200°–220° F. and heating was continued to 425° F. The reaction mixture which darkened upon addition of the iodine usually bleached out upon reaching 300+° F. The batch was held 1½ to 2 hours at 425° F. depending upon cure (30–35 sec.) (desired range) and a negative dimethyl-aniline test for free maleic anhydride. When the desired levels were reached, the batch was cooled to 350°–300° F. or below and butoxyethanol was added to approximately 80% solids. Based on the reactivity of the anhydride ring, it is felt that the ring is opened to a substantial degree by this ether alcohol. If all the anhydride ring were opened about 42% of the butoxyethanol would have been esterified. The remaining butoxyethanol acts as a cosolvent. The formulae and characteristics of the adducts are given below.

|  | Composition 1 | Composition 2 |
| --- | --- | --- |
| Esterified polyol | 437 g | 429 g. |
| Maleic anhydride | 35 g. 0.357 m. | 47 g. 0.482 m. |
| Iodine | 0.44 g. 0.1% | 0.43 g. |
| Xylene | 3.78 g | 3.70 g. |
| Butoxyethanol | 100.00 g. 0.846 m. | 135.00 g. 1.1423 m. |
|  | 576.22 g | 615.13 g |

CHARACTERISTICS

|  | Composition 1 | Composition 2 |
| --- | --- | --- |
| Percent maleic | 8.3% | 11.3% |
| Viscosity | [1] 58.4 | [2] 42 |
| Color | 10+ | 11− |
| Acid value | 53.05 | 62.35 |
| NVM | 81.09% | 76.74% |
| Wt./gal | 8.36 | 8.40 |

[1] Sec. (39.8 poises) at 77° F.
[2] Sec. (28.6 poises) at 77° F.

Water solutions were prepared by diluting the "half-ester" solutions to about 67.5% with butoxyethanol. A solution of lithium hydroxide monohydrate in water was then prepared and added to the diluted "half-ester." The actual formulae are given below.

| Composition 3 | Grams | Composition 4 | Grams |
| --- | --- | --- | --- |
| Composition No. 1 | 400 | Composition No. 2 | 450 |
| Butoxyethanol | 81.5 | Butoxyethanol | 61.6 |
| LiOH·H₂O | 12.1 | LiOH·H₂O | 13.0 |
| H₂O | 463.7 | H₂O | 497.4 |
|  | 957.3 |  | 1,022.0 |
| Viscosity | [1] 35 | Viscosity | [2] 55 |
| Color | 7 | Color | 7 |
| pH | 8.24 | pH | 7.43 |
| NVM | 34.33% | NVM | 34.43% |
| Wt./gal | 8.37 | Wt./gal | 8.39 |

[1] Sec. (23.9 poises).
[2] Sec. (37.5 poises).

Drying tests carried out on Compositions 3 and 4 gave the following results:

|  | Composition 3 | Composition 4 |
| --- | --- | --- |
| Set time | 0:30 | 0:30 |
| Tackfree time | 4:00 | 4:00 |
| Kraftfree time | 6:04 | 6:04 |
| Foilfree time | 7:04 | 7:04 |

EXAMPLE 2

This example illustrates a water soluble enamel formulation which includes the paint vehicle prepared as shown in Example 1.

|  | Lbs. |
| --- | --- |
| Titanium dioxide | 300 |
| Kaolin | 100 |
| Tetra potassium pyrophosphate | 2 |
| Sodium pentachlorophenate | 2 |
| Water | 115 |
| Paint vehicle—Composition 3 | 500 |
| Cobalt isodecanoate | 4 |
| Lead isodecanoate | 4 |
| Zinc naphthenate | 10 |
| Methylethyl ketoxime | 2 |
| Water | 40 |

The above enamel had excellent water resistance, good covering power, and the brushes and rollers used to apply the enamel were water washable.

As is described above, the polyol resin is esterified with an excess of an unsaturated fatty acid. The excess amount of fatty acid can range from about 5 to 50% excess. The fatty acids can be those contained in soybean oil, safflower oil, linseed oil, dehydrated castor oil, cotton seed oil, tall oil, and the like. Specific fatty acids include oleic acid, linoleic acid, linolenic acid, and the like. The polyols are generally esterified at temperatures of from about 400° to 550° F., and most often at a temperature of about 450° to 480° F. Rosin acids are difficult to esterify below 500° F. For this reason if a tall oil is used having a high rosin content a temperature in excess of 500° F. will be needed in most instances.

The ester is liquid at ordinary temperatures. The ester containing some retained solvent (e.g., 3.5% xylene) ordinarily will have a viscosity of from about 10 to 35 poises at 77° F., and preferably will have a viscosity of from about 14 to 19 poises at 77° F.

The maleinized or fumarized ester can be dissolved in a water insoluble organic solvent (e.g., xylene or mixtures containing mineral spirits) to produce a coating composition which can be applied to objects made of wood, plaster, steel or other metal or nonmetal surfaces and dried by baking in a conventional manner. Driers, for example, cobalt naphthenate, can be added to facilitate drying and to provide compositions which will dry to touch at lower temperatures or at ordinary room temperatures.

The invention is particularly important, however, in the preparation of water dispersed coating compositions of the type previously described which can be applied to many different types of surfaces, including metal, wood, and plaster.

Any of the foregoing coating compositions can be prepared with or without pigments.

It should be emphasized that the paint vehicle can be used in a solvent or water system without opening the anhydride ring. The opening of the ring with an alcohol and the subsequent formation of a salt improves the water dispersibility of the vehicle. Solvents such as mineral spirits can be used for dilution and later incorporation into a water soluble vehicle. The vehicle has been solubilized directly in water with a later addition of cosolvent.

Obviously many modifications and variations of the invention as hereinbefore set forth may be made without departing from the spirit and scope thereof, and therefore only such limitations should be imposed as are indicated in the appended claims.

I claim:
1. A process which comprises esterifying a polyol of the formula

wherein $n$ is a whole number between 10 and 14, with from about 5 to 50% excess of an unsaturated fatty acid to the extent that the available hydroxyl groups are esterified and thereafter reacting the esterified polyol with from about 4 to 15% of a member selected from the group consisting of maleic anhydride and fumaric acid based on the weight of the ester.

2. A process as claimed in claim 1 wherein from 10 to 50% excess of an unsaturated fatty acid is used and wherein the esterified polyol is reacted with from about 8 to 12% of said anhydride or acid based on the weight of the ester.

3. A process as claimed in claim 2 in which maleic anhydride is used, the anhydride rings are opened and the resultant product is mixed with an alkaline material in an amount effective to increase its water dispersibility.

4. A process as in claim 1 wherein the esterification reaction is carried out at a temperature of from about 400° to 550° F.

5. A maleinized or fumarized fatty ester of a polyol of the formula

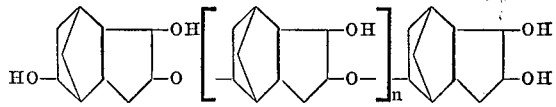

wherein $n$ is a whole number between 10 and 14 obtained by the process of claim 1.

6. A maleinized fatty ester as in claim 5 dissolved in a water insoluble solvent capable of opening the anhydride ring.

7. A maleinized or fumarized product as in claim 5 reacted with an alkaline material in an amount effective to increase water dispersibility.

8. A water dispersed coating composition comprising a product as claimed in claim 7.

9. A coating composition comprising a product as claimed in claim 5.

References Cited
UNITED STATES PATENTS

| | | | |
|---|---|---|---|
| 3,223,659 | 12/1965 | Curtice et al. | 260—22 |
| 3,341,485 | 9/1967 | Long | 260—22 |
| 3,340,213 | 9/1967 | McGary et al. | 260—22 |

FOREIGN PATENTS

| | | |
|---|---|---|
| 1,016,957 | 1/1966 | Great Britain. |

DONALD E. CZAJA, Primary Examiner

R. W. GRIFFIN, Assistant Examiner

U.S. Cl. X.R.

117—161; 260—29.2, 31.2, 31.4, 32.4, 32.6, 33.2, 33.4, 33.6, 40

UNITED STATES PATENT OFFICE
CERTIFICATE OF CORRECTION

Patent No. 3,532,650   Dated October 6, 1970

Inventor(s) James A. Arvin

It is certified that error appears in the above-identified patent and that said Letters Patent are hereby corrected as shown below:

Column 2, line 8, " 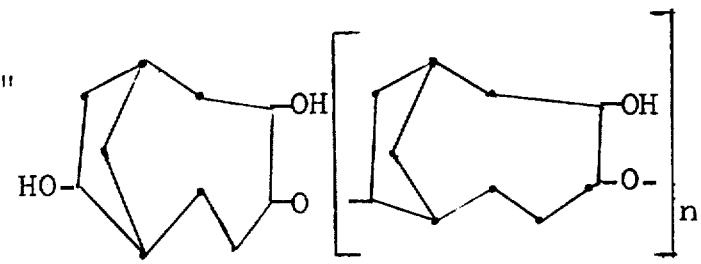 "

should read

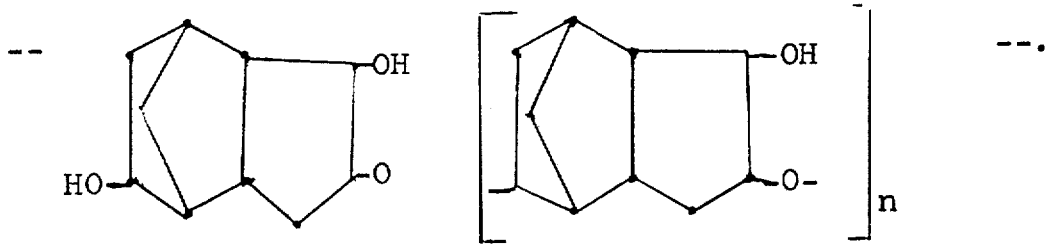 --.

Column 3, line 56, "5.0.357 m" should read -- g. 0.357 m --.

Column 1, line 6, "Co." should read -- Company --.

JAN 19 1971

(SEAL)
Attest:

Edward M. Fletcher, Jr.
Attesting Officer

WILLIAM E. SCHUYLER, JR.
Commissioner of Patents